UNITED STATES PATENT OFFICE.

OSWALD SILBERRAD, OF BUCKHURST HILL, ENGLAND.

PURIFICATION OF NITRO BODIES.

1,095,937. Specification of Letters Patent. Patented May 5, 1914.

No Drawing. Original application filed June 3, 1912, Serial No. 701,242. Divided and this application filed November 23, 1912. Serial No. 733,197.

*To all whom it may concern:*

Be it known that I, OSWALD SILBERRAD, a subject of the King of Great Britain and Ireland, and residing at Buckhurst Hill, in the county of Essex, England, have invented certain new and useful Improvements in and Relating to the Purification of Nitro Bodies, of which the following is a specification.

This is a division of the application filed June 3, 1912 bearing Serial Number 701,242.

The present invention relates to the purification of nitro bodies and particularly to the purification of nitrated coal tar products of high boiling point such as those described in my application for Letters Patent Serial No. 701242 from which this application is a division. Thus it is desirable to submit the nitrated oil obtained as described in my application for Letters Patent Ser. No. 701242, to further purification in so far as that, contrary to all experience with nitro compounds, it will be found that no amount of washing with soda will raise the heat test of the product beyond three or four minutes, and after a prolonged series of researches the following process was arrived at whereby a stable material which gives a satisfactory heat test is produced. Before passing on to describe this process, I desire to state that I am well aware that it is a common practice to wash nitroglycerin (*i. e.*, glycerol nitrate) with warm soda, and that certain nitro derivatives of toluene are commonly subjected to the action of alkalis for the production of stilbene derivatives, but that no such process as that described below has ever been applied to any nitro compound, and that the results of the treatment lead to an entirely novel technical effect, in that by means thereof I am able to produce a stable nonvolatile, liquid nitro hydrocarbon.

The invention consists in purifying such nitro compounds by stirring said compounds with a weak solution, say 5 per cent. of soda ash at a temperature of 50° to 70° C. for a period of about twelve to twentyfour hours.

The invention further consists in purifying nitro compounds by treatment with excess of water to which has been added a difficultly soluble body capable of taking up nitrous acid to form a body inert as regards the nitrated product such as marble or other carbonate or hydroxids of one or more of the alkaline earths, the liquid being gently boiled under a reflux condenser until all the unstable compounds are decomposed.

In the application of my invention, for example, to the purification of nitro derivatives of the high boiling fractions of coal tar, the nitro compound is first stirred with a five per cent. solution of soda ash, preferably at about 50° to 70° C. for a period of about 12 to 24 hours. The nitro compound is then separated, washed with water, and run into a suitable vessel containing clean water, preferably about ten times its bulk, and a few lumps of marble or the like are added and the whole gently boiled under a reflux condenser until all unstable compounds are decomposed. This process generally occupies from about 24 to 48 hours.

Instead of soda ash the carbonates, bicarbonates or hydroxids of any of the alkali metals or mixtures containing any or all of these may be used. Similarly, instead of marble, I may use chalk, dolomite, magnesia, or the carbonates or hydroxids of any or all of the alkaline earths or mixtures of these or any compound difficultly soluble and capable of taking up the nitrous acid produced by the gradual decomposition of the unstable products.

When nitro derivatives of the higher boiling-point fractions of coal tar referred to in my application for Letters Patent Serial No. 701242 are purified by the process above described, I find that the product is not only rendered stable, but undergoes other changes. Thus, the viscosity is altered, and the tendency to solidify is lessened, while the quantity of solid produced in the event of solidification occurring is reduced. Other insufficiently pure or mixed nitro compounds may be purified in a similar manner. The treatment is, therefore, of considerable importance when the products are required for the manufacture of explosives, and especially of plastic explosives, as by means of the purification great stability, which is essential in such explosives, can be obtained.

By purification by means of carbonates or hydroxids of the alkaline earths either with or without previous treatment with soda ash or the like I find that the heat test of the product is greatly raised, whereas purified in the ordinary manner, nitrated burning naphtha, solvent naphtha, and products produced according to the process described in my said application for Letters Patent, seldom show a heat test exceeding five minutes. Further, the tendency of the product to freeze and the consequent difficulty and danger of thawing is reduced.

Having now described my invention what I claim as new and desire to secure by Letters Patent is:—

A process for purifying nitro compounds of the aromatic series which consists in mixing such compounds with a weak solution of soda ash in the warm, and then treating the mixture with an excess of water to which has been added a difficultly soluble body capable of taking up nitrous acid to form a body inert as regards the nitro compounds, and boiling the liquid gently under a reflux condenser until the unstable compounds are decomposed.

In testimony whereof I have signed my name to this specification in the presence of two subscribing witnesses.

OSWALD SILBERRAD.

Witnesses:
J. W. PATCHING,
E. C. THORP.

---

Copies of this patent may be obtained for five cents each, by addressing the "Commissioner of Patents, Washington, D. C."